US006950675B2

(12) United States Patent
Wilhelm

(10) Patent No.: US 6,950,675 B2
(45) Date of Patent: Sep. 27, 2005

(54) RADIO COMMUNICATIONS SYSTEM AND COMPONENTS FOR A METHOD OF RADIO TRANSMISSION BY VARIOUS RADIO TRANSMISSION MODES

(75) Inventor: Michael Wilhelm, Vaihingen/Enz-3 (DE)

(73) Assignee: Alcatel, Paris (FR)

( * ) Notice: Subject to any disclaimer, the term of this patent is extended or adjusted under 35 U.S.C. 154(b) by 720 days.

(21) Appl. No.: 09/814,052

(22) Filed: Mar. 22, 2001

(65) Prior Publication Data

US 2001/0029191 A1 Oct. 11, 2001

(30) Foreign Application Priority Data

Apr. 5, 2000 (DE) .......................................... 100 16 889

(51) Int. Cl.[7] .................................................. H04M 1/00
(52) U.S. Cl. ..................... 455/552.1; 455/517; 455/450
(58) Field of Search .............................. 455/450, 452.1, 455/453, 454, 553.1, 445, 422.1, 507, 509, 512, 516, 517, 524, 525, 552.1

(56) References Cited

U.S. PATENT DOCUMENTS 5,590,397 A 12/1996 Kojima
5,963,863 A * 10/1999 Berggren .................... 455/445
6,002,948 A * 12/1999 Renko et al. ............... 455/567
6,351,638 B1 * 2/2002 Robinson .................... 455/418
6,556,820 B1 * 4/2003 Le et al. ..................... 455/411
6,603,755 B1 * 8/2003 Parker ........................ 370/342
6,658,101 B1 * 12/2003 Calvez .................. 379/201.01
2003/0114186 A1 * 6/2003 Goetz ......................... 455/552

FOREIGN PATENT DOCUMENTS

GB 2294844 A * 5/1996 ............ H04Q/7/38
WO WO 9949690 A1 * 9/1999 ............ H04Q/7/38

* cited by examiner

*Primary Examiner*—Sonny Trinh
*Assistant Examiner*—Sam Bhattacharya
(74) *Attorney, Agent, or Firm*—Sughrue Mion, PLLC

(57) ABSTRACT

A radio communications system and method in which at least one base station (BS1) also contains a transceiver in order to transmit and receive by various radio transmission modes (DECT, GSM, UMTS), and in which the base station (BS1) is connected to a controller (RRM) which determines an availability value for each of the various radio transmission modes (DECT, GSM, UMTS) with the aid of preselectable criteria and controls the base station (BS1) in order to transmit to a wireless subscriber terminal (MT) an identification code at least for the radio transmission mode (DECT) which has the highest availability value. At least the radio transmission mode (DECT) which has the best instantaneous availability in the coverage area of the base station (BS1) is offered to the subscriber terminal (MT) by the base station (BS1). The controller (RRM) connected to all base stations can carry out this function centrally in order to utilize the radio resources of the entire system, which is preferably designed as multi-standard system.

12 Claims, 3 Drawing Sheets

RADIO COMMUNICATIONS SYSTEM AND COMPONENTS FOR A METHOD OF RADIO TRANSMISSION BY VARIOUS RADIO TRANSMISSION MODES

BACKGROUND OF THE INVENTION

The invention relates to a radio communications system according to the preamble of claim 1, a base station for it and a control means connected thereto, a wireless subscriber terminal for it and a method of radio transmission according to one of the independent claims.

A wireless subscriber terminal with a transceiver which transmits radio signals by various radio transmission modes to base stations and receives radio signals therefrom is known from U.S. Pat. No. 5,590,397. A first system which operates according to a first radio transmission mode, in particular according to a mobile radio standard for public cellular radio, forms a first part of the base stations. A second system which operates according to a second, different radio transmission mode, in particular according to a radio standard for private cordless telecommunication, forms a second part of the base stations. Each system has a broadcast channel via which a system identification code is transmitted. The broadcast channels have to be scanned by the subscriber terminal. A priority list in which the system identification codes of the systems are listed in a preferred sequence is stored in the wireless subscriber terminal, and the subscriber terminal selects the best system identification code from the received system identification codes with the aid of the priority list. It therefore selects the best radio transmission mode for the subscriber terminal. Therefore a radio communications system with at least one base station and with at least one wireless subscriber terminal which contains a transceiver in order to transmit and receive radio signals by at least two different radio transmission modes and which contains a selector in order to select one of the various radio transmission modes at least prior to a subscriber connection being established with one of the, at least one, base stations, is known from U.S. Pat. No. 5,590,397. The known radio communications system and method of radio transmission have the disadvantage, however, that a bottleneck can occur in the radio coverage if a large number of subscriber terminals have similar priority lists and, as a result, select the same radio transmission mode to establish subscriber connections at the same time. Consequently, only one of the two systems would be loaded for the most part. In addition, the providers who provide their radio services via the various systems must recognise the various system identification codes and store them in the subscriber profiles.

SUMMARY OF THE INVENTION

The object of the invention is to create a radio communications system and a method of radio transmission with which sufficient radio coverage is ensured at all times without the above-mentioned disadvantages occurring. In addition, a base station for this and a control means connected thereto and a wireless subscriber terminal are to be provided.

The object is achieved by a radio communications system with the features of claim 1 and by a method of radio transmission, by a base station, by a control means connected thereto, and by a wireless subscriber terminal with the features according to one of the independent claims.

A radio communications system is accordingly proposed in which the at least one base station also contains a transceiver in order to transmit and receive by various radio transmission modes, and in which the at least one base station is connected to a control means which determines an availability value for each of the various radio transmission modes with the aid of preselectable criteria and controls the base station in order to transmit to the wireless subscriber terminal an identification code at least for the radio transmission mode which has the highest availability value. The method of radio transmission according to the invention with the corresponding features is characterised in that radio signals are also transmitted and received by the base station by various radio transmission modes, and in that an availability value is determined for each of the various radio transmission modes by a control means connected to the base station with the aid of preselectable criteria and the base station is controlled in order to transmit to the wireless subscriber terminal an identification code at least for the radio transmission mode which has the highest availability value.

As a result of the measures according to the invention at least the radio transmission mode which has the best instantaneous availability in the coverage area of this base station is offered to the subscriber terminal by the base station. Furthermore, a control means connected to all base stations can carry out this function centrally. The invention has the advantage that the supply side of the radio communications system influences the choice of radio transmission modes, wherein the radio coverage can be controlled centrally by the control means in order to use radio resources very efficiently. The base stations can also be successively equipped and expanded with means, in particular with software, for transmission by a new radio transmission mode. As a result, gradual introduction of new technology into the radio communications system is possible without the entire radio communications system having to be switched off.

Particularly advantageous developments of the invention emerge from the sub-claims.

Accordingly, it is particularly advantageous if the preselectable criteria are the radio resources instantaneously available in the radio system and if the control means assign the radio transmission mode which instantaneously has the most radio resources the highest availability value by monitoring the radio resources available at each base station connected to the control means. The radio resources are therefore managed centrally and utilised optimally.

It is also particularly advantageous if the various radio transmission modes comprise standardised methods of radio transmission, in particular various versions of standardised methods of radio transmission, and if the transceiver of the at least one base station and of the at least one wireless subscriber terminal can transmit and receive radio signals according to these standardised methods of radio transmission. As a result of these measures, the invention is developed for establishing a multi-standard system which can gradually be expanded by new future standards and can therefore be upgraded very cost efficiently. Various versions of standards can also be provided. Early introduction of a new standard is also very easily possible in that a first test version of this new standard, a so-called beta version, is provided.

A further advantage is afforded if the control means for the base station creates a priority list in which the identification codes for the radio transmission modes are listed in an order of precedence dependent on the size of their availability values, if the base station transmits this priority list to the wireless subscriber terminal, and if the wireless subscriber terminal receives the priority list and checks by means of the identification codes of the radio transmission modes listed there whether at least one of the identification codes gives a radio transmission mode by which the transceiver of the subscriber terminal can transmit and receive radio signals. The subscriber terminal is therefore sent a list with preferred radio transmission modes offered for selection. As a result, the probability that the subscriber terminal accepts one of the offered modes is increased. As a result, the connection is made considerably more quickly. In this context, if at least two identification codes give radio transmission modes by which the transceiver of the subscriber terminal can transmit and receive radio signals, it is particularly advantageous if the wireless subscriber terminal selects the radio transmission mode which has the highest availability value. As a result it is ensured that the best possible radio transmission mode for both sides (subscriber side and network side) is selected.

It is also particularly advantageous if initially, the wireless subscriber terminal transmits to the base station the identification codes for all the radio transmission modes by which the transceiver of the subscriber terminal can transmit and receive radio signals and if the control means for the base station then creates the priority list by means of the identification codes transmitted by the subscriber terminal, only these identification codes being listed in the priority list in an order of precedence dependent on the size of their availability values. The priority list therefore only contains the identification codes for those radio transmission modes which the subscriber terminal can use. As a result of these measures, the priority list is created considerably more quickly. In this context it is particularly advantageous if the wireless subscriber terminal combines the identification codes for the radio transmission modes in accordance with a preselectable order of precedence into a wish list and transmits this wish list to the base station, and if the control means for the base station then creates the priority list by means of the transmitted wish list, the identification codes being listed in the priority list with the same high availability values as those in the order of precedence desired by the subscriber terminal.

In addition, it is particularly advantageous in this context if the wireless subscriber terminal contains input means, by means of which the subscriber preselects the order of precedence of the radio transmission modes listed in the wish list, or if the wireless subscriber terminal contains evaluation means which preselect the order of precedence of the radio transmission modes listed in the wish list by means of the telecommunications service desired by the subscriber. The wish list can accordingly be created either manually or automatically.

BRIEF DESCRIPTION OF THE DRAWINGS

The invention and the advantages emerging therefrom will be described in more detail with the aid of embodiments and with reference to the following drawings, in which.

DETAILED DESCRIPTION OF THE INVENTION

Figure 1:
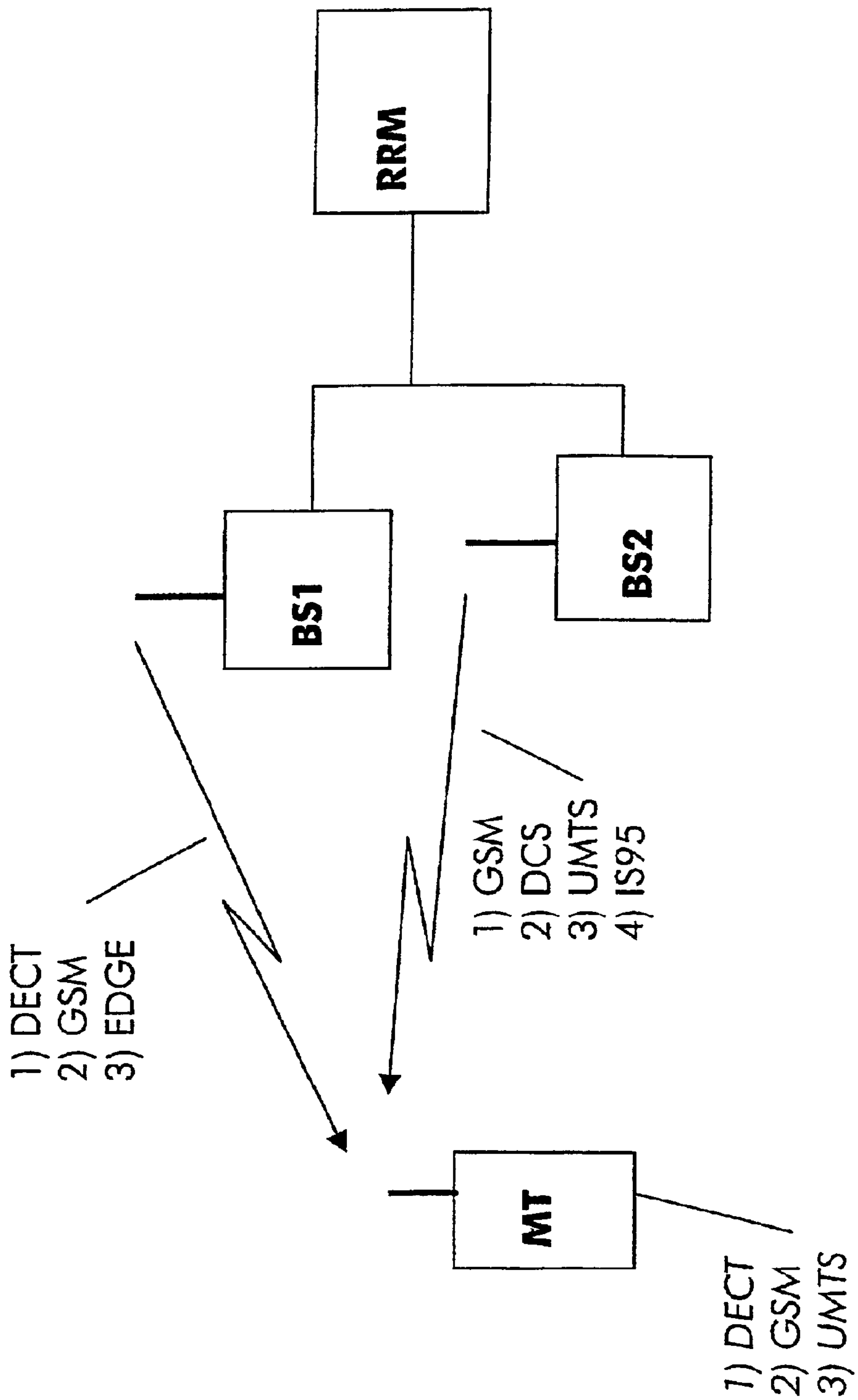
FIG. 1 shows schematically the design of a radio communications system.

FIG. 1 shows the schematic design of a radio communications system according to the invention. The system contains a plurality of base stations, of which two base stations BS1 and BS2 are shown by way of example. The two base stations are connected to a control means RRM which monitors the radio resources in the radio system and controls the base stations. The functions of the control means RRM include inter alia monitoring and assigning of the various radio channels and the allocation of the various radio transmission modes, described in more detail below, and the associated creation of priority lists.

Each of the base stations BS1 and BS2 provides a cell in which the wireless subscriber terminals are located. The subscriber terminals are radio linked to at least one of the base stations and can be permanently installed in position or can move through the cells of the system. FIG. 1 shows just one single wireless subscriber terminal MT by way of example for many.

The subscriber terminal MT contains a transceiver, which is not shown, which can transmit and receive radio signals by a plurality of radio transmission modes, here, for example, by the three modes DECT, GSM or UMTS. In addition, the subscriber terminal contains a selector, not shown, which selects one of the various radio transmission modes DECT, GSM or UMTS preferably prior to a subscriber connection being established.

The base stations BS1 and BS2 also contain transceivers, not shown, which can also transmit and receive by various radio transmission modes. The first base station BS1 can transmit or receive radio signals in accordance with the three radio transmission modes DECT, GSM or EDGE. The second base station BS2 is even capable of transmitting and receiving radio signals by four different radio transmission modes GSM, DCS, UMTS or IS95. The transmission modes DECT, GSM, DCS, UMTS or IS95 in each case concern different radio transmission standards which are known by these names. The radio transmission mode EDGE is a radio transmission mode optimised for the wireless transmission of data, which mode is standardised in the context of GSM and bears this name.

As the example according to FIG. 1 shows, the wireless subscriber terminal MT is capable of exchanging radio signals with the first base station BS1 in accordance with the radio transmission mode DECT or GSM. In relation to the second base station BS2, the wireless subscriber terminal MT can exchange radio signals by the transmission mode GSM or UMTS. This means that the wireless subscriber terminal, if it uses the GSM mode, can move from one cell to another without the mode having to be changed. However, it might be sensible to change the radio transmission mode if, for example, the first base station BS1 provides the radio coverage in the subscriber's home and the second base station BS2 supplies a public domain. In this case, the subscriber might prefer the DECT mode in the coverage area of the first base station BS1 and the GSM mode in the coverage area of the second base station BS2, because use of the DECT radio transmission means a more favourable tariff in comparison with the GSM radio transmission, so the subscriber prefers the DECT mode. This criterion is only one of many subscriber-side criteria which can be used when selecting the mode and which the subscriber himself can preselect or which can already be stored in the subscriber terminal.

According to the invention proposed here, the network-side criteria are also evaluated in order to determine the availability of the various radio transmission modes. The various radio transmission modes are then offered to the subscriber terminal MT by the base stations BS1 and BS2 in accordance with their instantaneous availability. The preselectable criteria are evaluated by the control means RRM in order to assign an availability value in each case to the various radio transmission modes. At least the radio transmission mode which has the highest availability value is offered to the wireless subscriber terminal MT. Preferably, however, a list ordered according to priorities is created by the control means RRM and transmitted to the wireless subscriber terminal. Therefore, the subscriber terminal MT can generally chose from a plurality of radio transmission modes. The example of FIG. 1 shows that the first base station BS1 offers the modes DECT, GSM and EDGE. The second base station BS2 offers the modes GSM, DCS, UMTS and IS95.

The criteria which the control means RRM uses to offer the various radio transmission modes can be preselected by both the radio network provider and the subscriber. Criteria such as the subscriber's desired telecommunications services, the tariffs (charges) agreed for the transmission modes, the instantaneous capacity utilisation of the radio resources (usage of the individual radio channels within the transmission modes) are conceivable. Other criteria, such as the location of the respective base station (private or public domain), the interference resistance of the various transmission modes to instantaneously occurring interference, and general network planning aspects can also be used to create a priority list.

The priority lists are transmitted, prior to a subscriber connection being established, via a broadcast channel which is standard for all radio transmission modes. It is also conceivable that a separate broadcast channel is used for each mode, in particular when various radio transmission standards are offered. In this case, the complete priority list is transmitted on each of the broadcast channels, so the subscriber terminal need only listen to one broadcast channel.

The control means can be integrated not only centrally, for example in a radio network controller or in a mobile switching centre, but a control means can also be integrated in each base station.

A method of radio transmission according to the invention is described below with the aid of FIG. 2*a*, wherein reference is also made to the radio communications system shown in FIG. 1.

Figure 2A:
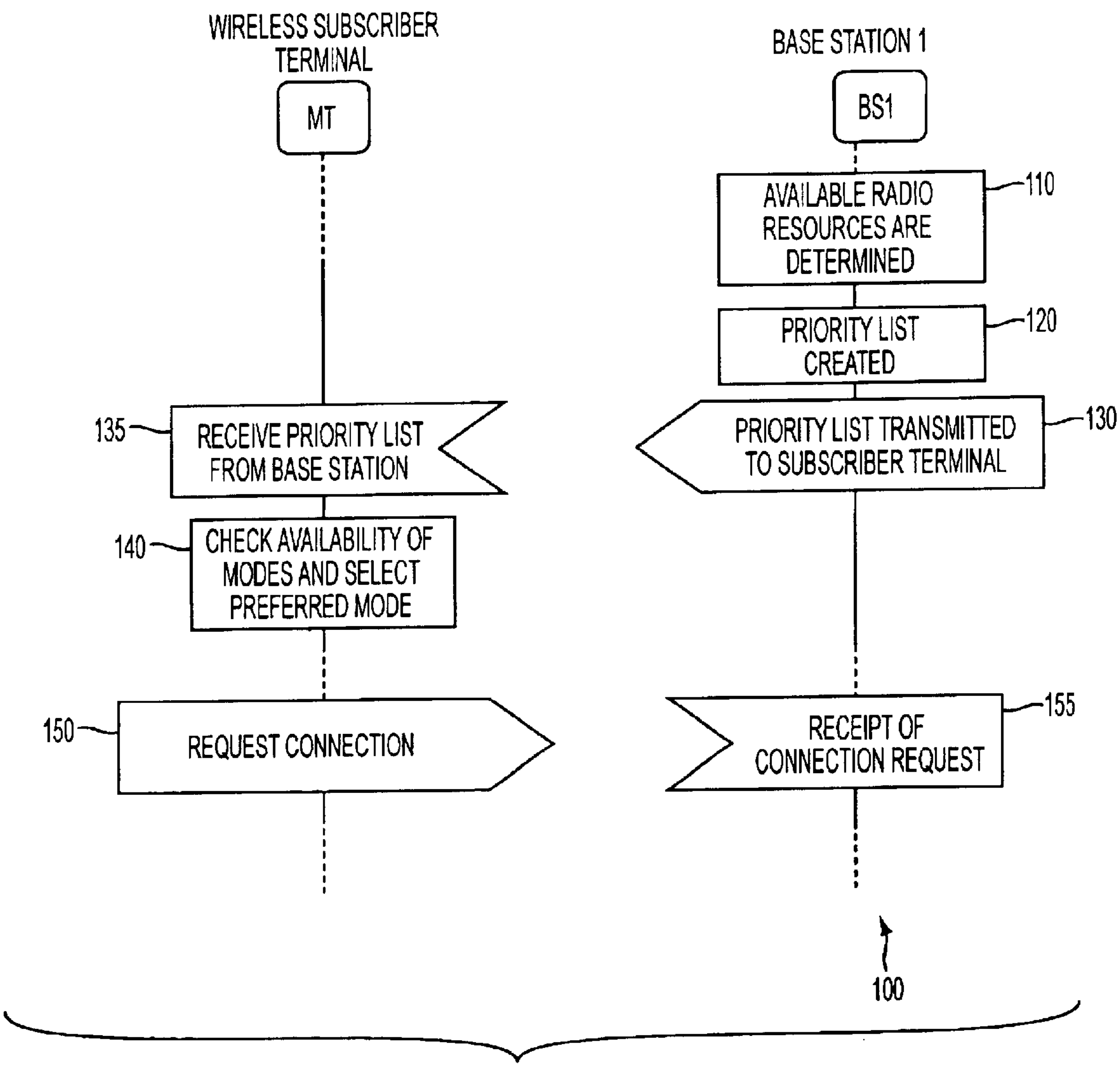
FIG. 2*a* shows the flow diagram for a method of radio transmission.

FIG. 2*a* shows the flow diagram of a first method 100 for establishing a subscriber connection between the wireless subscriber terminal MT and the base station BS1. The available radio resources are initially determined in a first step 110. This function is carried out by the control means connected to the base station. The control means can also be integrated into the base station. In particular, it is checked which of the possible radio transmission modes, here for example DECT, GSM or EDGE, is instantaneously available. The number of free radio channels, the signal-to-noise ratio (S/N), the carrier-to-interference ratio (CIR) and other criteria play a part in this process. A priority list is then created in a next step 120 in which the instantaneously available radio transmission modes are listed. For this purpose, each radio transmission mode is initially assigned an availability value which is higher the better the availability of the mode. In this example, it is clear that more DECT radio channels are free than GSM or EDGE radio channels. Therefore, the radio transmission mode DECT receives the highest availability value and is entered in the first position on the priority list. The other radio transmission modes GSM and EDGE have lower availability values and are entered on the list in position 2 and 3 respectively. The priority list compiled in this way indicates which of the three radio transmission modes should preferably be used to make the radio transmission. In a next step 130, this priority list is then transmitted via the broadcast channel to the wireless subscriber terminal MT.

The subscriber terminal MT, which receives this priority list in a next step 135, can select a mode from the radio transmission modes DECT, GSM or EDGE offered to it, wherein the order of precedence in the priority list indicates which radio transmission modes should preferably be used. In a next step 140 the subscriber terminal MT then checks which of the modes recorded in the priority list the transceiver of the subscriber terminal can use at all. In this example, the transceiver of the subscriber terminal MT is basically capable of transmitting and receiving radio signals by the modes DECT, GSM or UMTS. The subscriber terminal MT then establishes in step 140 that only the two modes DECT and GSM can be considered for selection for establishing a subscriber connection with the base station BS1 because the mode UMTS is not offered by the base station BS1. In the simplest case, the subscriber terminal MT then accepts the sequence preselected in the priority list and accordingly selects the preferred mode DECT. Subsequently, establishing of a DECT subscriber connection is requested in a next step 150. The base station BS1 then receives this request in a step 155. The subscriber connection is then established in accordance with the steps known in all respects and not described in detail here.

Step 140 can also be expanded to the effect that the subscriber terminal MT selects a radio transmission mode from the priority list received, wherein predetermined criteria in the subscriber terminal MT are also taken into account. For example, the subscriber prefers the use of the radio transmission mode GSM, so the subscriber terminal MT also selects the mode GSM in this example even though this mode appears only in the second position on the priority list. It could also be the case that the subscriber terminal MT, coming from the cell of the second base station BS2 and using the GSM mode, enters the cell of the first base station BS1 and wishes to retain the GSM mode. The example shows that the method of radio transmission according to the invention can be carried out not only to establish a subscriber connection for the first time, but also to implement a handover. In the simplest case, only the radio transmission mode with the best availability is offered to the subscriber terminal, in that the base station transmits an identification code for this radio transmission mode to the subscriber terminal. Preferably, however, a priority list is created and transmitted to the subscriber terminal MT for the purpose of selection. By taking into account the instantaneously available radio resources when preselecting the at least one radio transmission mode, the transmission capacity in the entire radio communications system is clearly increased.

Figure 2B:
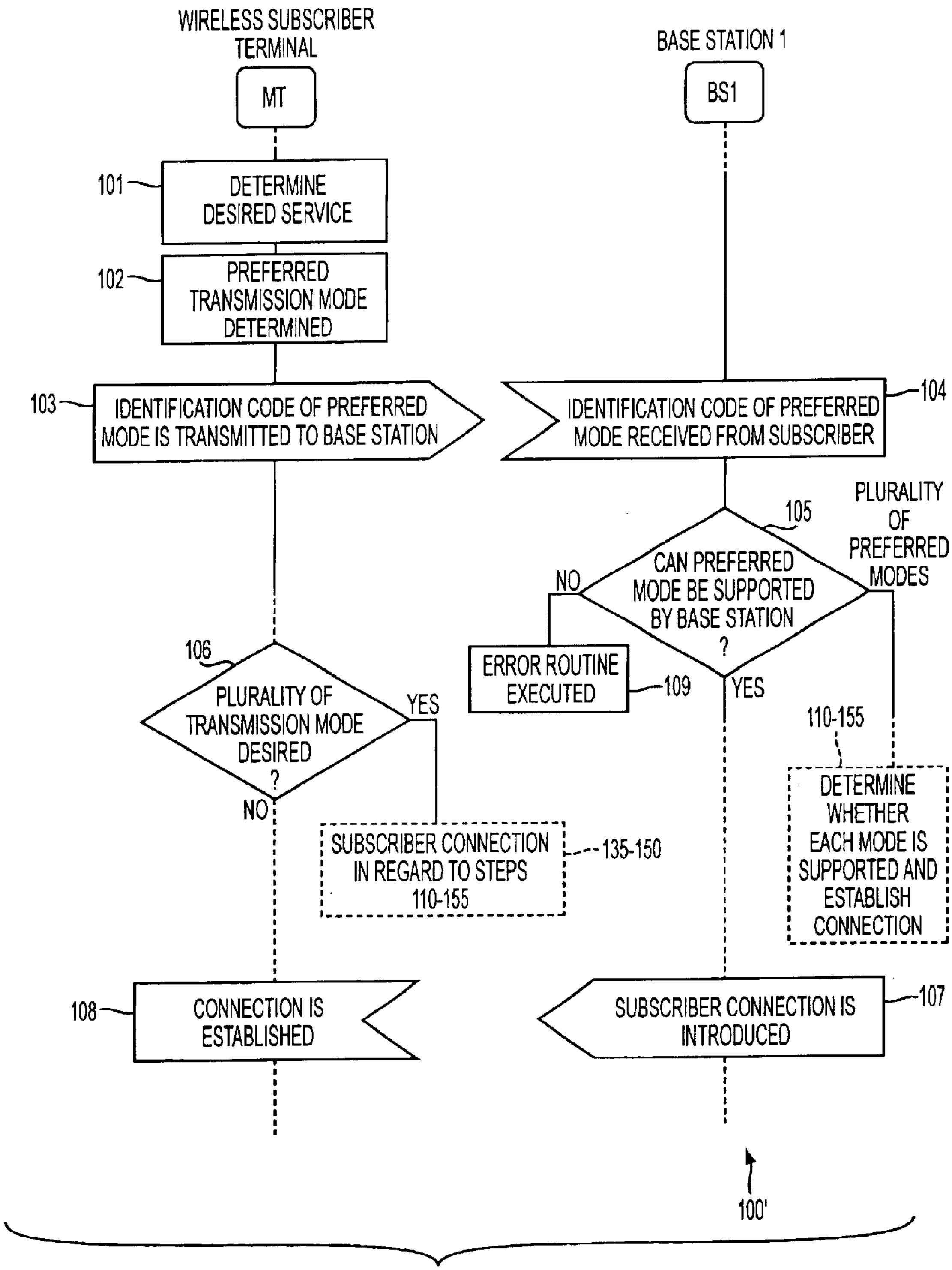
FIG. 2*b* shows a variation of the flow diagram according to FIG. 2*a*.

FIG. 2*b* shows a variation of the above-described method. Reference is also made to FIG. 1 in the description of this variation below.

FIG. 2*b* shows the flow diagram for a method 100' in which identification codes for the desired radio transmission modes are initially transmitted to the base station BS1 by the subscriber terminal MT.

In the simplest case, the subscriber terminal MT transmits only one identification code for the mode it prefers to the base station BS1. In this case, the evaluation of criteria, such as the desired telecommunications services, the transfer rate demanded, the instantaneous location (indoor or outdoor) or else the preferred tariff model play a part.

In this example, it is initially checked in a first step 101 which telecommunications service is desired. Possible services are, for example voice services, data services, short messages, fax services, e-mail or internet services in accordance with the so-called WAP protocol. In this example, the subscriber only wants to make a telephone call, i.e. he wants to use a voice service. He does this, for example, by activating the keypad which functions as input means for the subscriber terminal MT. Speech input by means of voice recognition is also conceivable. In a next step 102, the possible and appropriate radio transmission mode is determined by the subscriber terminal with the aid of the input of the desired service. In a subsequent step 103, the identification code of this mode is then transmitted to the base station BS1, i.e. it is signalled which mode the subscriber terminal MT desires and prefers. Here, the mode DECT, for example, is determined and signalled.

The base station BS1 receives the identification code for this preferred mode DECT in a step 104 and checks in a subsequent step 105 whether this mode can be supported by the base station BS1. If the base station BS1 cannot support this mode DECT, branching off to a step 109 follows in which an error routine is executed. If the mode can, however, be supported by the base station BS1, then a corresponding subscriber connection is introduced in the next step 107. According to this example, a DECT subscriber connection is to be established.

The branching off point to the steps 110 to 155, which is also shown in FIG. 2*b*, will be dealt with in more detail below. In a next step 108, the subscriber terminal MT receives this signal in order to establish a DECT subscriber connection. Conventional steps, which are not described in detail here, for the purpose of establishing this subscriber connection then follow.

At the subscriber terminal side, the step 108 is preceded by a step 106 in which the subscriber terminal MT checks whether only one radio transmission mode, such as DECT in this case, or a plurality of radio transmission modes is desired. If only one radio transmission mode is desired then step 108 is carried out. If a plurality of radio transmission modes are desired, however, then the steps 135 to 150, described below, are carried out.

In the above description of FIG. 2*b*, it has hitherto been assumed that the subscriber terminal MT desires only one radio transmission mode and signals this to the base station BS1 in step 103. It is, however, also conceivable that the subscriber terminal transmits a wish list with a plurality of radio transmission modes to the base station. This wish list can, for example, contain all the radio transmission modes which can be used by the transceiver of the subscriber terminal. In accordance with the wireless subscriber terminal MT shown in FIG. 1, these would be the three radio transmission modes DECT, GSM or UMTS. Accordingly, it is conceivable that the base station BS1 receives in step 104 from the subscriber terminal MT a wish list in which a plurality of modes, namely DECT, GSM and UMTS are recorded. Should this be the case, this is determined in step 105 and branching to steps 110 to 155 then follows, i.e. to the method steps already described with the aid of FIG. 2*a*. The procedure carried out in the subscriber terminal MT also branches in step 106 to the corresponding steps 135 to 150. This means that initially, the base station makes a preselection for the priority list to be created by the control means with the aid of the wish list received. A priority list is then created in which only those radio transmission modes can occur which the subscriber terminal has signalled and which it can also use. For this purpose, the partial method already described with the aid of FIG. 2*a* is carried out in the steps 110 to 155, including steps 135 to 150, by which, finally, the subscriber terminal MT selects a mode from the priority list created.

The method described with the aid of FIGS. 2*a* and 2*b* and the radio communications system described with the aid of FIG. 1 are preferably designed in such a way that radio transmissions can take place in accordance with various radio transmission standards, i.e. that a multi-standard-compliant radio communication can take place. In the process, both the subscriber terminal and the base stations are capable of operating in accordance with various mobile radio standards. It is also possible that radio signals are transmitted in accordance with various versions of a standard. As a result, a new standard, for example, can be introduced very early into the radio communications system in the form of a test version (beta version). The proposed transmission of identification codes for particularly preferred radio transmission modes, in particular radio transmission standards, facilitates optimal use of the available radio resources.

What is claimed is:

1. A radio communications system comprising:

at least one base station; and at least one wireless subscriber terminal which contains a transceiver in order to transmit and receive radio signals by at least two different radio transmission modes, and which contains a selector to select one of the at least two radio transmission modes at least prior to a subscriber connection being established with one of the at least one base stations, wherein the at least one base station also contains a transceiver in order to transmit and receive by various radio transmission modes, wherein the at least one base station is connected to a control means which determines an availability value for each of the various radio transmission modes with the aid of preselected criteria, and controls the base station in order to transmit to the at least one wireless subscriber terminal, an identification code for at least the radio transmission mode which has the highest availability value, wherein the control means creates a priority list for the at least one base station in which the identification codes for the radio transmission modes are listed in an order of precedence dependent on the size of respective availability values, wherein the base station transmits the priority list to the wireless subscriber terminal, wherein the wireless subscriber terminal receives the priority list and checks by means of the identification codes of the listed radio transmission modes whether at least one of the identification codes gives a radio transmission mode by which the transceiver of the subscriber terminal can transmit and receive radio signals, wherein the wireless subscriber terminal transmits to the base station, the identification codes for all the radio transmission modes by which the transceiver of the subscriber terminal can transmit and receive radio signals, and wherein the control means for the base station then creates the priority list by means of the identification codes transmitted by the subscriber terminal, the identification codes being listed in the priority list in an order of precedence dependent on the size of respective availability values.

2. The radio communications system according to claim 1, wherein the preselected criteria are radio resources instantaneously available in the radio system, and wherein by monitoring the radio resources available at each base station connected to the control means, the control means assigns the highest availability value to the radio transmission mode which instantaneously has the most radio resources.

3. The radio communications system according to claim 1, wherein the various radio transmission modes comprise standardized methods of radio transmission, in particular various versions of standardized methods of radio transmission, and wherein the transceiver of the at least one base station and of the at least one wireless subscriber terminal can transmit and receive radio signals in accordance with the standardized methods of radio transmission.

4. The radio communications system according to claim 1, wherein, in the event that at least two identification codes give radio transmission modes by which the transceiver of the subscriber terminal can transmit and receive radio signals, the wireless subscriber terminal selects the radio transmission mode which has the highest availability value.

5. The radio communications system according to claim 1, wherein the wireless subscriber terminal lists the identification codes for the radio transmission modes in accordance with a preselected order of precedence to form a wish list and transmits this wish list to the base station, and wherein the control means for the base station then creates the priority list by means of the transmitted wish list, the identification codes being listed in the priority list with the same availability values in order of precedence of the radio transmission modes within the wish list.

6. The radio communications system according to claim 5, wherein the wireless subscriber terminal contains input means by which the subscriber preselects the order of precedence of the radio transmission modes listed in the wish list.

7. The radio communications system according to claim 5, wherein the wireless subscriber terminal contains a computer which preselects the order of precedence of the radio transmission modes listed in the wish list by means of the telecommunications service desired by the subscriber.

8. A wireless subscriber terminal in a radio communications system which contains at least one base station, comprising:

a transceiver in order to transmit and receive, radio signals by at least two different radio transmission modes, and which contains a selector in order to select one of the various radio transmission modes at least prior to a subscriber connection being established with one of the at least one base stations, wherein the wireless subscriber terminal receives identification codes from the at least one base station, the at least one base station containing a transceiver, in order to transmit and receive by various radio transmission modes, the at least one base station connected to a control means which determines an availability value for each of the various radio transmission modes with the aid of preselected criteria and controls the at least one base station to transmit to the wireless subscriber terminal, the identification code at least for the radio transmission mode which has the highest availability value, wherein the control means creates a priority list for the at least one base station in which the identification codes for the radio transmission modes are listed in an order of precedence dependent on a size of respective availability values, wherein the base station transmits the priority list to the wireless subscriber terminal, wherein the wireless subscriber terminal receives the priority list and checks by means of the identification codes of the listed radio transmission modes whether at least one of the identification codes gives a radio transmission mode by which the transceiver of the subscriber terminal can transmit and receive radio signals, wherein the wireless subscriber terminal transmits to the base station, the identification codes for all the radio transmission modes by which the transceiver of the subscriber terminal can transmit and receive radio signals, and wherein the control means for the base station then creates the priority list by means of the identification codes transmitted by the subscriber terminal, the identification codes being listed in the priority list in an order of precedence dependent on the size of respective availability values.

9. A base station for a radio communications system comprising:

at least one wireless subscriber terminal which contains a transceiver, in order to transmit and receive radio signals by at least two different radio transmission modes, and which contains a selector in order to select one of the various radio transmission modes at least prior to a subscriber connection being established with the base station, wherein the base station contains a transceiver in order to transmit and receive by various radio transmission modes, wherein the base station is connected to a control means which determines an availability value for each of the various radio transmission modes with the aid of preselected criteria in order to control the base station so the base station transmits, to the wireless subscriber terminal, an identification code at least for the radio transmission mode which has the highest availability values, wherein the control means creates a priority list for the base station in which identification codes for the radio transmission modes are listed in an order of precedence dependent on a size of respective availability values, wherein the base station transmits the priority list to the wireless subscriber terminal, wherein the wireless subscriber terminal receives the priority list and checks by, means of the identification codes of the listed radio transmission modes whether at least one of the identification codes gives a radio transmission mode by which the transceiver of the subscriber terminal can transmit and receive radio signals, wherein the wireless subscriber terminal transmits to the base station, the identification codes for all the radio transmission modes by which the transceiver of the subscriber terminal can transmit and receive radio signals, and wherein the control means for the base station then creates the priority list by means of the identification codes transmitted by the subscriber terminal, the identification codes being listed in the priority list in an order of precedence dependent on the size of respective availability values.

10. A control means for at least one base station in a radio communications system with at least one wireless subscriber terminal which contains a transceiver in order to transmit and receive radio signals by at least two different radio transmission modes and which contains a selector in order to select one of the various radio transmission modes at least prior to a subscriber connection being established with one of the at least one base stations, wherein the at least one base station contains a transceiver in order to transmit and receive by various radio transmission modes, wherein the control means determines an availability value for each of the various radio transmission modes with the aid of preselected criteria and controls the base station to transmit to the wireless subscriber terminal, an identification code at least for the radio transmission mode which has the highest availability value, wherein the control means creates a priority list for the at least one base station in which identification codes for the radio transmission modes are listed in an order of precedence dependent on a size of respective availability values, wherein the base station transmits the priority list to the wireless subscriber terminal, wherein the wireless subscriber terminal receives the priority list and checks by means of the identification codes of the listed radio transmission modes whether at least one of the identification codes gives a radio transmission mode by which the transceiver of the subscriber terminal can transmit and receive radio signals, wherein the wireless subscriber terminal transmits to the base station, the identification codes for all the radio transmission modes by which the transceiver of the subscriber terminal can transmit and receive radio signals, and wherein the control means for the base station then creates the priority list by means of the identification codes transmitted by the subscriber terminal, the identification codes being listed in the priority list in an order of precedence dependent on the size of respective availability values.

11. A method of radio transmission in a radio communications system in which radio signals are transmitted and received by a wireless subscriber terminal by at least two different radio transmission modes and in which one of the various radio transmission modes is selected by the subscriber terminal at least prior to a subscriber connection being established with a base station, comprising:

transmitting and receiving radio signals by various radio transmission modes, by the base station, determining an availability value for each of the various radio transmission modes by a control means connected to the base station with the aid of preselected criteria; and controlling the base station to transmit to the wireless subscriber terminal, an identification code at least for the radio transmission mode which has the highest availability value, wherein a priority list is created for the base station in which the identification codes for the radio transmission modes are listed in an order or precedence dependent on the size of respective availability values, wherein the priority list is transmitted by the base station to the wireless subscriber terminal, wherein the priority list is received by the wireless subscriber terminal and is checked by means of the identification codes of the radio transmission modes listed to determine whether at least one of the identification codes gives a radio transmission mode by which the transceiver of the subscriber terminal can transmit and receive radio signals, wherein the identification codes for all the radio transmission modes by which the transceiver of the subscriber terminal can transmit and receive radio signals are transmitted to the base station from the wireless subscriber terminal, and wherein the priority list is created for the base station by means of the identification codes transmitted by the subscriber terminal, such that the identification codes are listed in the priority list in an order of precedence dependent on the size of respective availability values.

12. The method of radio transmission according to claim 11, wherein the priority list is transmitted to the wireless subscriber terminal prior to the subscriber connection being established.

* * * * *